(12) United States Patent
Hayashida

(10) Patent No.: US 6,286,740 B1
(45) Date of Patent: Sep. 11, 2001

(54) ENERGY-SUPPLYING, SIGNAL-TRANSMITTING AND/OR MATERIAL-SUPPLYING METHOD AND APPARATUS FOR LINEARLY-TRAVELING MECHANISM

(75) Inventor: Tatekazu Hayashida, Sagamihara (JP)

(73) Assignee: Tsuden Kabushiki Kaisha, Sagamihara (JP)

( * ) Notice: Subject to any disclaimer, the term of this patent is extended or adjusted under 35 U.S.C. 154(b) by 0 days.

(21) Appl. No.: 09/116,598

(22) Filed: Jul. 16, 1998

(30) Foreign Application Priority Data

Jul. 18, 1997 (JP) ..................................... 9-194126

(51) Int. Cl.[7] ........................... B65H 51/32; B65H 54/28; B65H 57/28
(52) U.S. Cl. ............................. 226/88; 73/865.9
(58) Field of Search ................... 226/88, 196.1; 73/865.9

(56) References Cited

U.S. PATENT DOCUMENTS

| 4,048,705 | * | 9/1977 | Blanpain et al. ................... 419/61 |
| 5,472,407 | * | 12/1995 | Schenck ............................... 601/40 |

FOREIGN PATENT DOCUMENTS

| 261633 | * | 10/1990 | (JP) . |
| 195871 | * | 7/1992 | (JP) . |
| 223998 | * | 8/1992 | (JP) . |
| 8149651 | | 6/1996 | (JP) . |

\* cited by examiner

*Primary Examiner*—Thomas P. Noland

(57) ABSTRACT

In an energy-supplying, signal-transmitting and/or material-supplying apparatus for a linearly-traveling mechanism comprising a movable section reciprocating along traveling guides and supplying-cables/hoses, which is guided and held by a flexible support member, for supplying energy from a non-moving section corresponding to the movable section and/or transmitting and receiving signals to and from the non-moving section and/or supplying/discharging materials from the non-moving section, the support member is composed of a band-shaped solid member formed to an arc-shape which is curved in a lateral direction with one end of the support member fixed to the movable section and the other end thereof fixed to the non-moving section and travels while forming parallel portions which are parallel with the fixed portion of the movable section and the fixed portion of the non-moving section and a curved portion having an approximately constant radius of curvature with the convex direction of the lateral-arc-shaped portion facing inward. With this arrangement, energy, signals and/or materials can be stably supplied to a linearly-traveling mechanism which reciprocates the great many number of times.

25 Claims, 13 Drawing Sheets

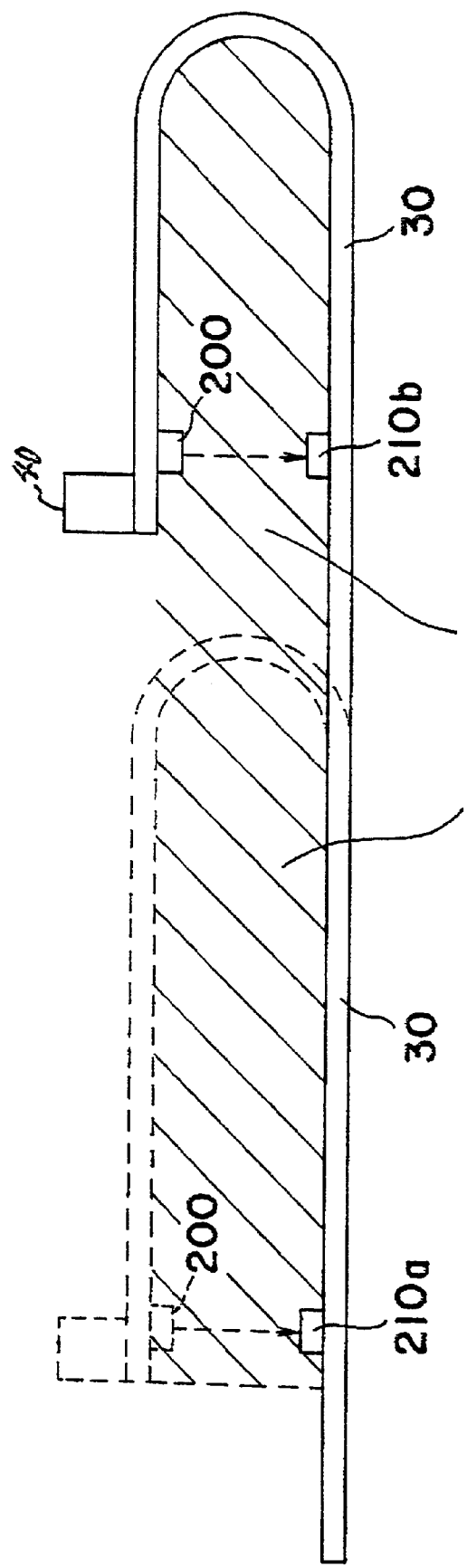

ENERGY-SUPPLYING, SIGNAL-TRANSMITTING AND/OR MATERIAL-SUPPLYING METHOD AND APPARATUS FOR LINEARLY-TRAVELING MECHANISM

BACKGROUND OF THE INVENTION

1. Field of the Invention

The present invention relates to an energy-supplying, signal-transmitting and/or material-supplying method and apparatus for supplying energy, signals and/or materials to a linearly-traveling mechanism such as a ball screw drive mechanism, a chain/belt drive mechanism and the like, and more specifically, to a method of and apparatus for using ribbon cables/hoses which are useful to supply energy such as electricity and the like from a non-moving section to a movable section and/or transmit and receive signals to and from the movable section and/or supply and/or discharge materials from the non-moving section to the movable section.

2. Description of the Related Art

Conventionally, although the cable guide for a linearly-traveling mechanisms is used in various industrial fields such as the output devices of computers and OA (Office Automation) equipment, automatic sliding doors, highrise warehouses, overhead traveling cranes, semiconductor manufacturing equipment operated in a clean room, automatic animal/plant factories and the like, when it is intended to supply electricity, energy, or a printing ink liquid and the like in a sufficient amount from a non-moving section side of a building, fixed table and the like to a movable section side, they must be supplied through solid cables/hoses which are formed to a certain shape because they cannot be supplied by a wireless supplying system.

Although color printers and the like have a plurality of ink hoses which extend from a non-moving section to a movable section, since they are disorderly bound and only tentatively fixed by bands or the like arbitrarily, a problem arises in that maintenance is needed for the wear, break and the like of the ink hoses which are caused when they interfere with each other by being twisted or caught by a protrution. Thus, it has been desired to fundamentally solve the problem. In addition, when electric energy and the like are directly supplied to the linearly traveling mechanism making use of a wire, since the electric energy is supplied through a cable/hose which is curled, loosely hung or loosely crept, the connecting portion and bending portion of the cable/hose are twisted or crushed and stress is concentrated to the portions. Since the cable/hose is clogged, broken and subjected to contact failure, it is handled as an expendable supply with a short lifetime.

Japanese Patent Publication No.8-149651 discloses the cable guide for a linearly-traveling mechanism by which the above problems are solved. The above invention serving as a base of the present invention provides a small cable guide which has sufficient durability even if it is used to a mechanism which reciprocates a total traveling distance longer than 500 km at a high speed of at least 2 m/sec.

Although the above invention discloses a technology for transmitting and receiving electric energy and electric signals, it discloses nothing as to an ink-liquid supply hose (cable) in inkjet printers and the like.

Since the inkjet printers and the like do not require a high speed motion higher than 2 m/sec. and their total traveling distance is within 100 km, a material-supplying apparatus which is simpler and can be easily mounted and dismounted has been desired for this type of the linearly-traveling mechanism.

Further, although the above invention has a short right-to-left traveling distance of about 1 m, when the aforesaid long cable guide which is used to a relatively long reciprocating distance of 2–5 m is disposed in a hollow space, there is also a problem that the cable guide is slacked as a whole by the weight of a cable itself and the like.

In addition, with only the disposition of the aforesaid cable guide, there is a further problem of safety in that when the operator approaches the space where the cable travels together with a movable section, the operator is liable to be caught by the traveling cable and get hurt.

SUMMARY OF THE INVENTION

An object of the present invention made in view of the above circumstances is to provide an energy-supplying and material-supplying method and apparatus for supplying energy and materials for a linearly-traveling mechanism reciprocating to the right and left, the method and apparatus permitting cables/hoses for supplying them to be safely used for a long period of time without being bent at a midpoint thereof and clogged.

The present invention relates to an energy-supplying, signal-transmitting and/or material-supplying apparatus for a linearly-traveling mechanism comprising a movable section reciprocating along traveling guides and supplying-cables/hoses, which is guided and held by a flexible support member, for supplying energy from a non-moving section corresponding to the movable section and/or transmitting and receiving signals to and from the non-moving section and/or supplying and/or discharging materials from the non-moving section, and the above objects of the present invention can be achieved by that the support member is composed of a band-shaped solid member formed to an arc-shape which is curved in a lateral direction with one end of the support member fixed to the movable section and the other end thereof fixed to the non-moving section and travels while forming parallel portions which are parallel with the fixed portion of the movable section and the fixed portion of the non-moving section and a curved portion having an approximately constant radius of curvature with the convex direction of the lateral-arc-shaped portion facing inward or outward.

The present invention also relates to an energy-supplying, signal-transmitting and/or material-supplying method for a linearly-traveling mechanism comprising a movable section reciprocating along traveling guides and a supplying-cable/hose, which is guided and held by a flexible support member, for supplying energy from a non-moving section corresponding to the movable section and/or transmitting and receiving signals to and from the non-moving section and/or supplying and/or discharging materials from the non-moving section, and the above objects of the present invention can be also achieved by the steps of composing the support member of a band-shaped solid member formed to an arc-shape curved in a lateral direction; laminating a ribbon cable/hose by disposing the support member and the supplying-cable/hose slidably or integrally arranging them; fixing one end of the support member to the movable section as well as fixing the other end thereof to the non-moving section so as to form parallel portions which are parallel with the fixed portion of the movable section and the fixed portion of the non-moving section and a curved portion having an approximately constant radius of curvature with the convex direction of the lateral-arc-shaped portion facing inward or outward; and reciprocating the movable section so that the radius of curvature of the support member has the approximately constant radius of curvature.

BRIEF DESCRIPTION OF THE DRAWINGS

In the accompanying drawings:

FIG. 9 is a view describing a position measuring method making use of the invention;

DESCRIPTION OF THE PREFERRED EMBODIMENTS

Preferable embodiments of the present invention will be described below with reference to the accompanying drawings.

Figure 1:
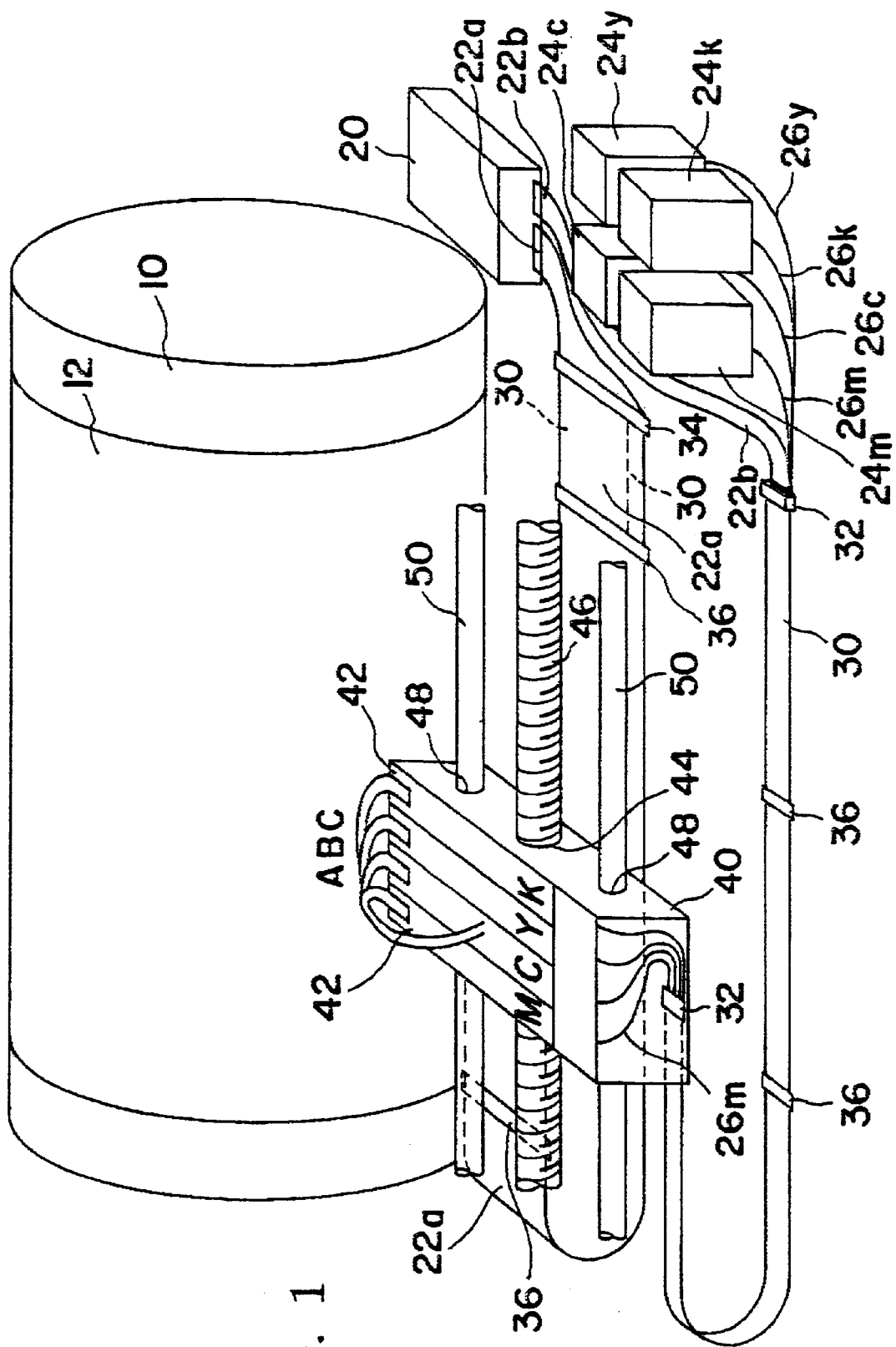
FIG. 1 is an overall perspective view of a linearly-traveling mechanism on which a supplying apparatus of the present invention is mounted.

FIG. 1 shows an embodiment in which the present invention is applied to the printer head unit of an inkjet printer. In the drawing, a linearly-traveling mechanism is a ball screw drive mechanism having a fixed screw shaft 46, a ball nut screwed to the screw shaft 46, a motor 44 assembled to the ball nut integrally therewith and a resolver/rotary-encoder for detecting the number of rotations of the motor and the nut, a printer head 40 as a movable section accommodates the ball nut and the motor 44 in the housing thereof and the head 40 can reciprocate along the screw shaft 46 with its rotation prevented by the action of rails 50 and sliders 48.

That is, a motor shaft is loosely inserted into the thread groove of the screw shaft 46 and the ball nut is fixed to the motor shaft integrally therewith and engaged with the thread groove. When the motor 44 rotates, the ball nut is rotated through the motor shaft and since the resolver/rotary-encoder is mounted on the motor integrally therewith, the rotation angle of the ball nut is detected by the resolver/rotary-encoder. As a result, when the ball nut is rotated by the rotation of the motor, the head 40 is reciprocated along the screw shaft 46 by the action of the ball nut and the thread groove of the screw shaft 46.

Ink nozzles 42*m*–42*k* are provided with the printer head 40 as the movable section so as to execute color printing onto a sheet 12 wound around a rotary drum 10. The operation of the ink nozzles 42*m*–42*k* is controlled by a print command which is transmitted thereto from a printer controller 20 incorporating a microprocessor and the like through a cable 22*a* which is guided and held by a flexible support member 30 as well as a traveling command is transmitted from the controller 20 to the motor 44 through a cable 22*b*. When the color print is executed, respective ink liquids such as cyan, magenta, yellow, black and the like are supplied from ink tanks 24*m*–24*k* to the printer head 40 through hoses 26*m*–26*k* which are guided and supported by the flexible support member 30 together with the cable 22*b*.

As shown in FIGS. 2A and 2B and FIGS. 3A and 3B, the support member 30 is characterized in that it is composed of a band-shaped solid member which is formed to an arc-shape curved in a lateral direction with one end 32 thereof fixed to the movable section 40 and the other end 32 fixed to the non-moving section of the base of an apparatus and travels while constituting parallel portions (A and A' in FIG. 4) which are parallel with the fixed portion 32 of the movable section 40 (FIG. 4) and the fixed portion 32 of the non-moving section and a curved portion (B in FIG. 4) having an approximately constant radius of curvature with the convex direction of the lateral arc-shaped facing outward (FIG. 2) or inward (FIG. 3).

That is, the support member 30 in the embodiment includes a metal material or metal whisker such as a band-shaped spring steel sheet, iron, amorphous iron alloy, etc., a nonferrous metal material such as copper, aluminum, gold, silver, titanium, etc. alloy or whisker thereof, ceramics including glass and/or ceramics fiber or whisker, paper, animal/plant fiber, rubber, synthetic rubber, synthetic resin, engineering plastic, FRP, CFRP and/or a material composed of a combination of the above materials, and one end of the support member 30 is fixed to the printer head 40 as the movable section by being tightened by screws and the other the end is fixed to the non-moving section as the base of the apparatus.

Figure 2A:
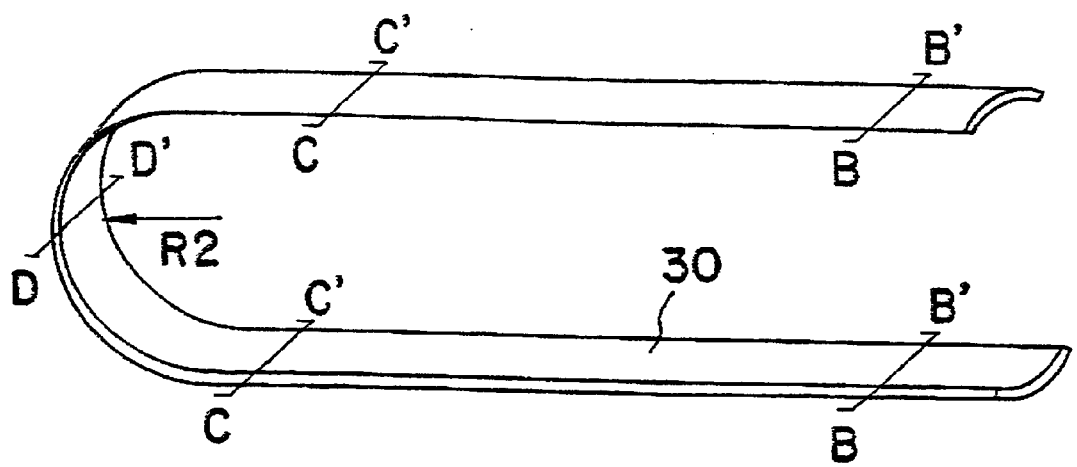
FIGS. 2A to 2D are views describing an operating principle of a support member of the present invention.
Figure 2B:
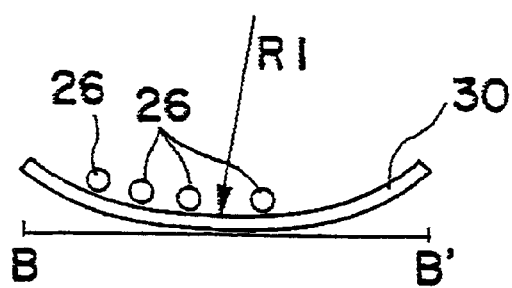
Figure 2C:
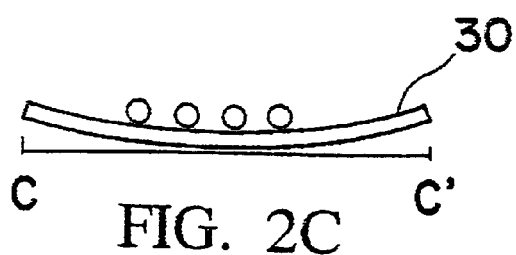
Figure 2D:
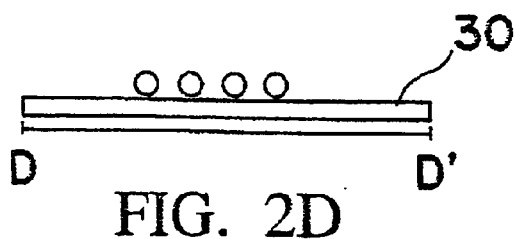
Figure 3A:
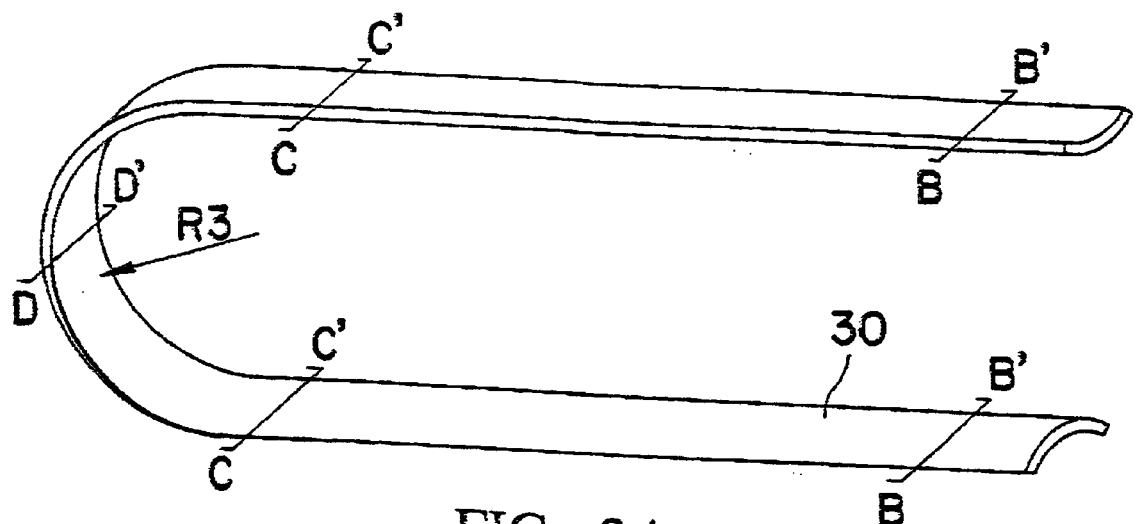
FIGS. 3A to 3D are views describing another operating principle of the support member of the present invention.
Figure 3B:
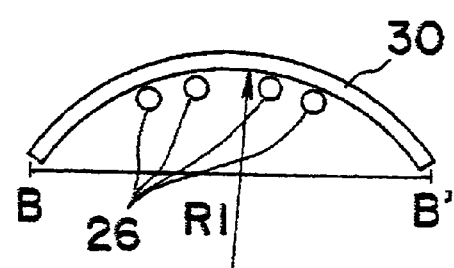
Figure 3C:
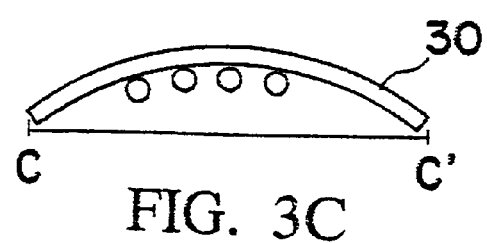
Figure 3D:
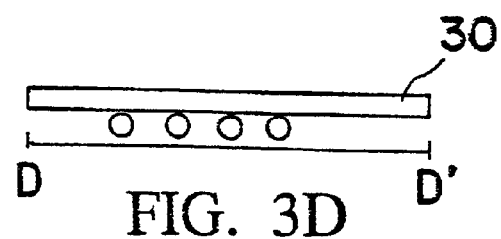

As shown in FIGS. 2B–2D and FIGS. 3B–3D, the lateral cross section of the support member 30 is formed to a laterally-curved-arc-shape (radius: R1) or an approximately-parabola-like-arc-shape. Then, since the cross section in the lateral direction has the arc-shaped portion as shown in FIG. 2B and FIG. 3B, the support member 30 has such a nature that even if it extends a relatively long distance in its longitudinal direction, the shape thereof is not deformed and no wrinkle and the like are generated thereto so that it can be maintained to the same shape. Further, the support member 30 has such a nature that when it is curved at a midpoint in a longitudinal direction, the portion thereof where it begins to curve is deformed in such a manner that the radius R1 of the arc-shaped portion gradually increases as shown in FIG. 2C or FIG. 3C and the cross section of the portion shown by D–D' in FIG. 2 and FIG. 3 where it is curved to a maximum degree is changed to flat as shown in FIG. 2D and FIG. 3D.

Figure 4:
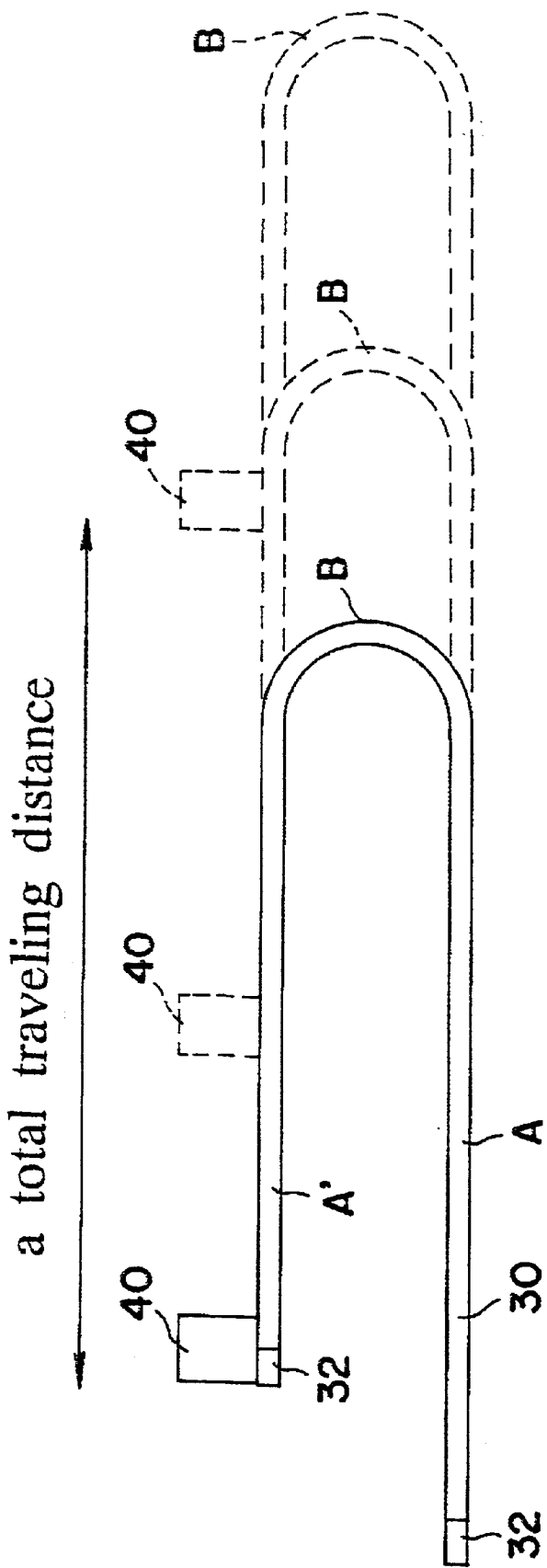
FIG. 4 is a view describing how the supplying apparatus of the present invention travels.

Moreover, the support member 30 has such a nature that when the curved portion is parallel moved by being clamping at the upper end or the lower end thereof as shown in FIG. 4, it makes the parallel movement while maintaining the radius of curvature of the curved portion substantially constant.

Accordingly, when material-supplying hoses 26 and a cable 22 are supported and held by the support member 30, no stress is imposed on the cable and the hoses at any portion except the curved portion and since the curved portion is bent at substantially the constant radius of curvature with the cross section thereof made to flat, the support member 30 can travel smoothly and flexibly without a twist force and no-compression/no-expansion force applied to the cable and the hoses.

FIG. 4 shows the linearly traveling state of the support member 30 and in the mounting state of the support member 30, it is formed of parallel portions A and A' which are parallel with the fixed portion 32 of the printer head 40 and the fixed portion 32 of the base of the apparatus, respectively and a curved portion B which is curved to a semi-circular shape having an approximately constant radius of curvature R2 (FIG. 2) or R3 (FIG. 3) and connected to the parallel portions A and A' at respective ends thereof. It is found from an experiment that since the lateral cross section of the curved portion B is formed to a flat surface as shown in FIG. 2D and FIG. 3D, the curved portion B does not impose any stress on the cable/hose and the support member 30 can be used without causing any problem at all even if it is curved in such a manner that the convex direction of the lateral arc-shaped portion (the arc-shaped portion having the radius R1) faces outward as shown in FIG. 2A or inward as shown in FIG. A at the portion thereof other than the curved portion.

It is preferable that the rigidity of the support member 30 is as high as possible in a degree by which the driving force of the motor 44 is reduced and that the lateral width thereof is about 5–40 mm. It is more economical to use a plurality of the support members having the lateral width of 5–40 mm to a wide cable/hose than a single wide support member as described below. With the above arrangement, the hoses 26 and the cable 22 can be guided and supported without adversely affecting a driving system. Moreover, the support member 30 is less flexed at a midpoint thereof by the dead load thereof as well as even if the support member 30 travels at a high speed, it can guide and hold the hose/cable by a constant bending force without imposing abnormal stress thereon at all times.

The relationship between the radius of curvature R1 of the lateral-arc-shaped portion of the support member 30 and the radii of curvature R2, R3 of the curved portion B thereof will be examined. It is generally conceived that the radius R1 of the lateral arc-shaped cross section of the support member 30 and the radii of curvature R2, R3 of the curved portion B after the support member 30 is mounted are affected by factors such as a lateral width, a size, a plate thickness, a material characteristics and the like. Although Japanese Patent Application No.6-312481 describes that R1 is approximately proportional to R2, no explicit relationship was admitted among R1, R2 and R3 as a result of experiment executed as to a member composed of plastic, paper, steel and the like in the range of R1 of about 5–40 mm.

More specifically, when the radius of curvature R1 was about 5 mm and steep, the radius of curvature R2 was sometimes made to a large size of about 30 mm. However, it was found that the radius of curvature R3 at the time a convex portion faced inward had a tendency to become larger than the radius of curvature R2 at the time a convex portion faced outward. Therefore, the radii of curvature R2, R3 of the curved portion B are pre-determined by an experiment depending upon the lateral width, R1 and material-characteristics of the support member 30 and the height between the fixing position of the base of the apparatus and the fixing position of the movable section is adjusted so that a specific interval is set between the height of the fixed portion 32 of the printer head 40 as the movable section and the height of the fixed portion 32 of the non-moving section of the base of the apparatus.

Figure 5A:
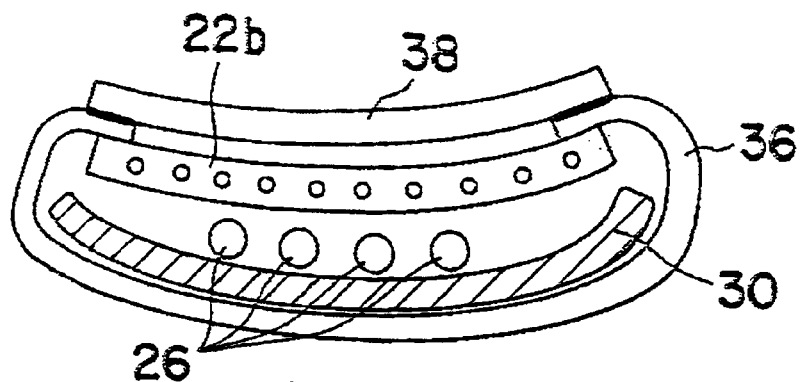
FIGS. 5A to 5C are views showing a lateral sectional view of the support member with the convex portion thereof facing outward.

FIG. 5A shows a lateral cross sectional view when the electric cable 22b and the material-supplying hoses 26 extend along the support member 30 of the present invention. In the embodiment, a multicore flat cable is used as the electric cable 22b, the ink hoses 26m–26k are clamped between the flat cable 22b and the support member 30 as well as a protective material 38 composed of engineering plastic such as Teflon, Kevlar, etc. or carbon fiber is placed on the upper surface of the flat cable 22b and laminated to the support member 30 in this state. Further, the hoses 26, the flat cable 22b and the support member 30 are slidably bundled by being wrapped by wrappers 36 at every specific intervals in the longitudinal direction of the support member 30 as well as they are prevented from being dislocated laterally by the arrangement. This ensures that the hoses 26 and the flat cable 22a can reciprocate along the support member 30 while smoothly sliding along the support member 30 without separating therefrom. Note, although the embodiment shown in FIG. 5A is described using the flat cable 22b as an example, this is also applicable to a round cable likewise.

Figure 5B:
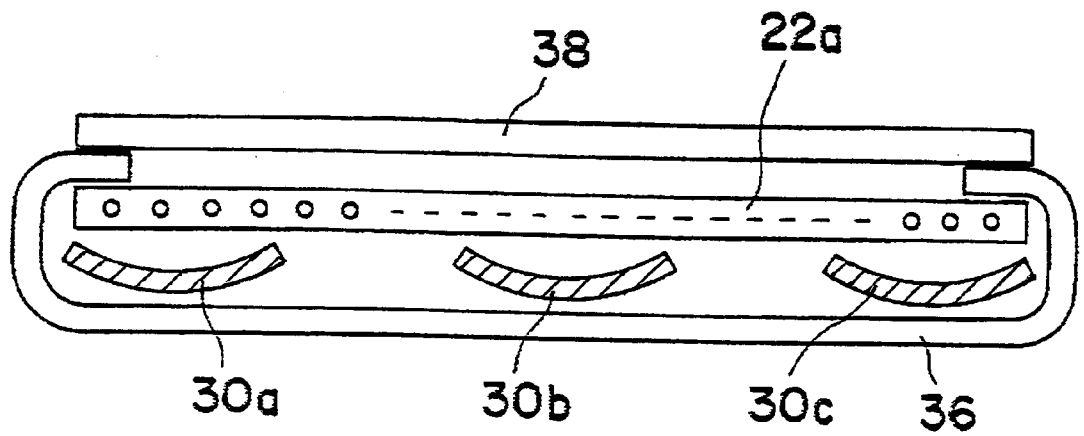
Figure 5C:
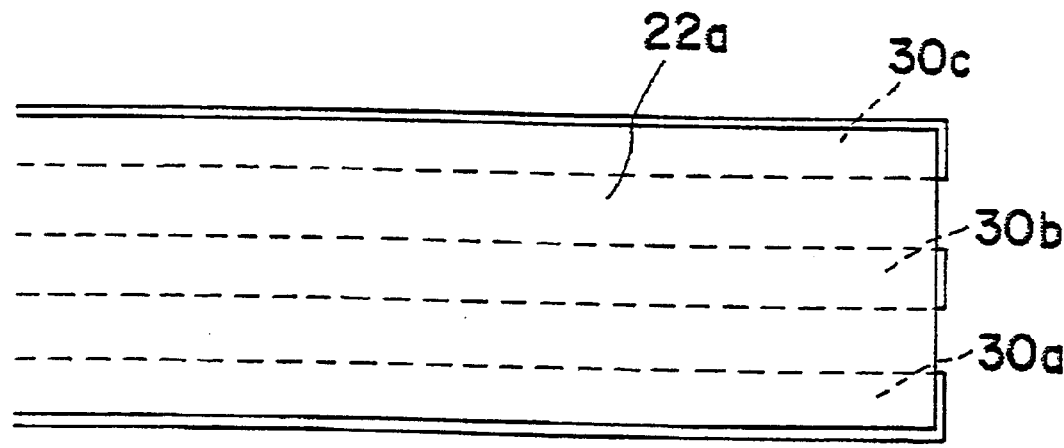

FIGS. 5B and 5C show a lateral cross sectional view (5B) and an installation plan view (5C) when a wide electric cable 22a is supported and held by a plurality of support members 30 of the present invention. In the example, a multicore flat cable is used as the wide electric cable 22a and the flat cable 22a is divisionally supported and held from the lower side thereof by support members 30a–30c. Then, a protective member 38 composed of engineering plastic or the like is placed on the upper surface of the flat cable 22a and laminated to the support members 30a–30c in this state. The flat. cable 22a and the support members 30a–30c are slidably bundled by being wrapped by wrappers 36 at every specific intervals in the longitudinal direction of the support member 30 as well as they are prevented from being dislocated laterally by the arrangement. This ensures that the wide flat cable 22a reciprocates along the support member 30 while smoothly sliding along the support members 30a–30c without separating therefrom. Further, an addition of conductivity to the protective member 38 prevents accumulation of the static electric-charges which are caused by the reciprocating motion.

Figure 6A:
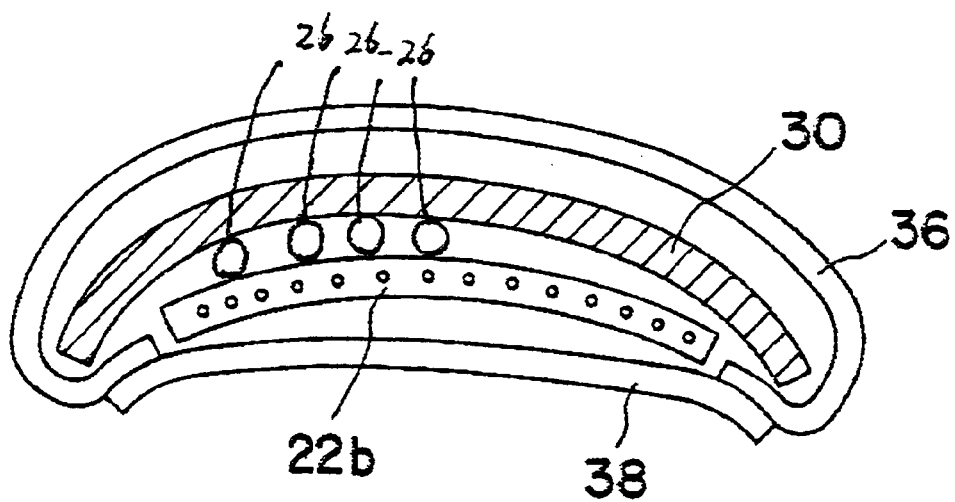
FIGS. 6A and 6B are views showing the lateral sectional view of the support member with the convex portion thereof facing inward.

FIG. 6, which is shown in correspondence to FIG. 5, shows a lateral cross sectional view of a support member 30 of the present invention in which a cable 22b and material-supplying hoses 26 extend along the support member 30 and a curved portion is formed at a midpoint of the support member 30 in the longitudinal direction thereof so that the lateral convex portion of the support member 30 faces inward. In FIG. 6A, a multicore flat cable is used as the narrow cable 22b and the ink hoses 26 are clamped by the flat cable 22b and the support member 30 as well as a protective member 38 is disposed outwardly of the flat cable 22b and laminated to the support member 30 in this state. Further, the hoses 26, the cable 22b and the support member are slidably bundled by being wrapped by wrappers 36 at every specific intervals in the longitudinal direction of the support member 30 as well as they are prevented from being dislocated laterally by the arrangement. Note, when the wrappers 36 are disposed to a loop shape at every relatively short intervals, the protective member 38 can be omitted although a processing and assembling time is made a little longer.

Figure 6B:
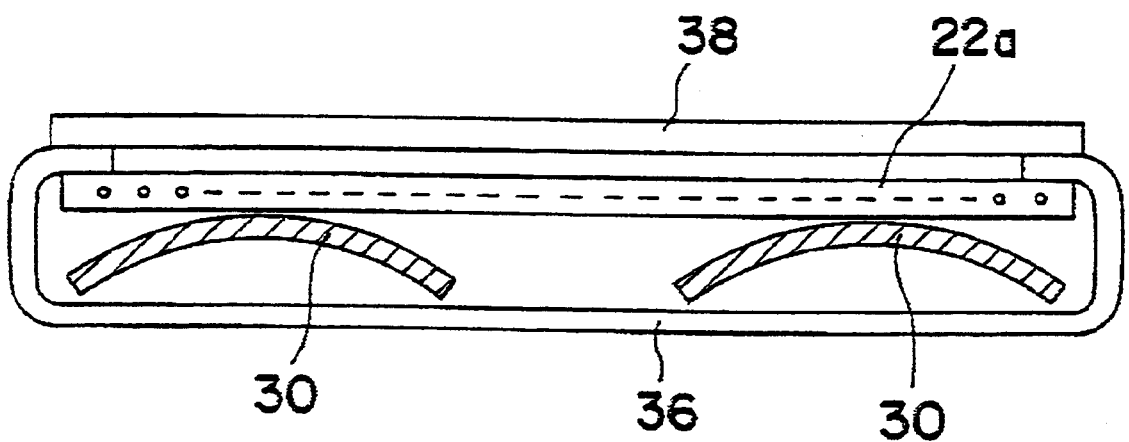

FIG. 6B, which is shown in correspondence to FIG. 5B, shows a lateral cross sectional view of a plurality of support members 30 of the present invention which are disposed side by side to support and hold a cable 22 wider than the support members 30. In the example, a multicore flat cable is used as the wide cable 22a which is divisionally supported and held from the lower surface thereof by support members 30a, 30b and the like. A protective member 38 is placed on the upper surface of the cable 22a and laminated to the support members 30a, 30 in this state. Further, the flat cable 22a and the support members 30a, 30b are slidably bundled by being wrapped by wrappers 36 at every specific intervals in the longitudinal direction of the support member 30a, 30b as well as they are prevented from being dislocated laterally by the arrangement. Note, when the wrappers 36 are disposed to a loop shape at every relatively short intervals, the protective member 38 can be omitted. In addition, the employment of the narrow support members 30a, 30b disposed side by side permits the cable 22a to be supported and held by a smaller number of members as compared with the case that a wide support member is used.

FIG. 10–FIG. 13, which are shown in correspondence to FIG. 5, show other embodiments of the present invention, respectively, in which support members 30b–30f are used in place of a protective member 38 to reduce the cost of the apparatus as a whole.

Figure 10A:
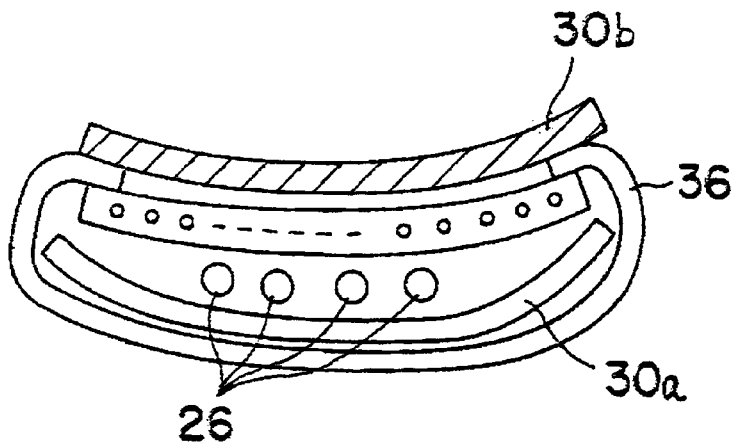
FIGS. 10A–10C are lateral sectional views of the invention when a support member is used in place of a protective member.

FIG. 10A, which is shown in correspondence to FIG. 5A, shows a lateral cross sectional view when a multicore flat cable is used as a cable 22b, hoses 26 are clamped between the flat cable 22b and a support member 30a as well as a support member 30b is disposed outwardly of the flat cable 22b in place of the protective member 38 and a curved portion is formed by bending the support member at a midpoint in the longitudinal direction thereof so that the lateral convex portion of the support member faces outward.

Figure 11A:
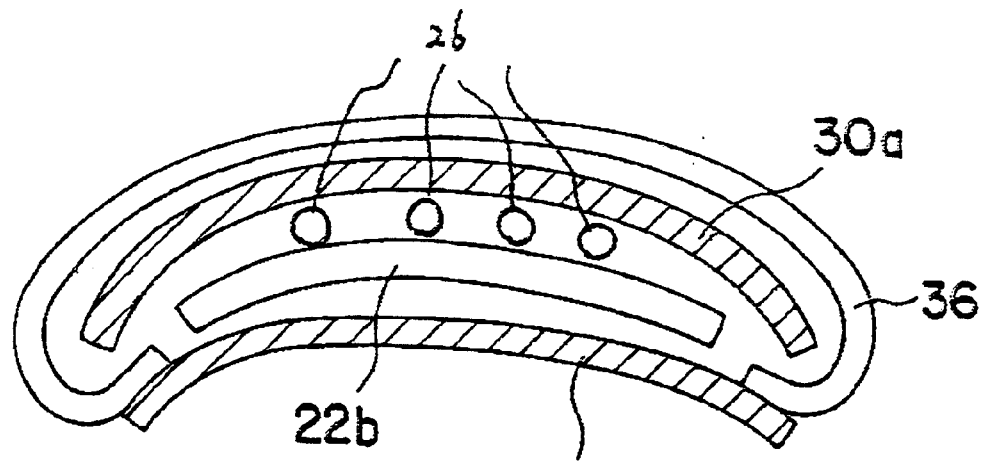
FIGS. 11A to 11B are views showing a modification of FIGS. 10A to 10C.

FIG. 11A, which is shown in correspondence to FIG. 10A, shows a lateral cross sectional view when the curved portion is formed by bending the support members at a midpoint in the longitudinal direction thereof so that the lateral convex portion of the support member faces inward. The hoses 26, the cable 22b and the support member 30a are slidably bundled by being wrapped by wrappers 36 at every specific intervals in the longitudinal direction of the support members 30a, 30b as well as they are prevented from being dislocated laterally by the arrangement. In addition, it is effective to interpose hollow spacers at specific intervals between the cable 22b and the support member 30a in such a manner that the hoses 26 are not pressed by them.

Figure 10B:
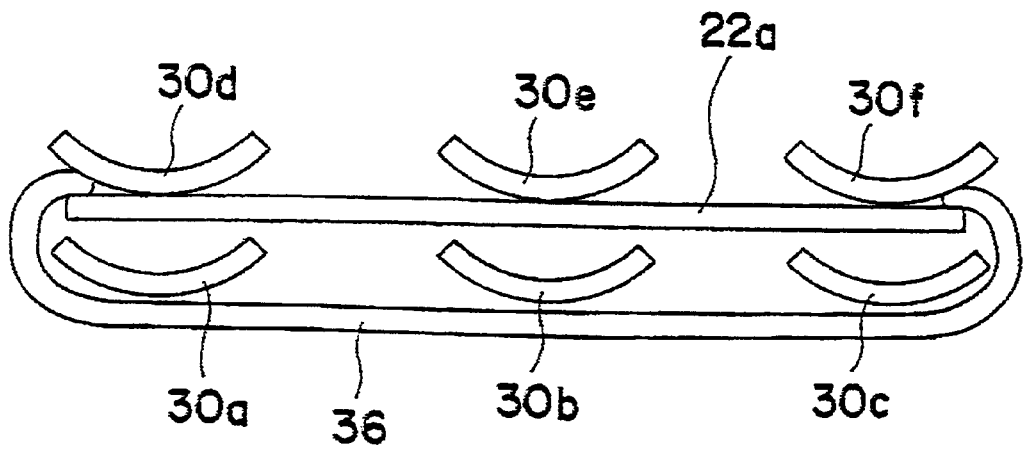
Figure 10C:
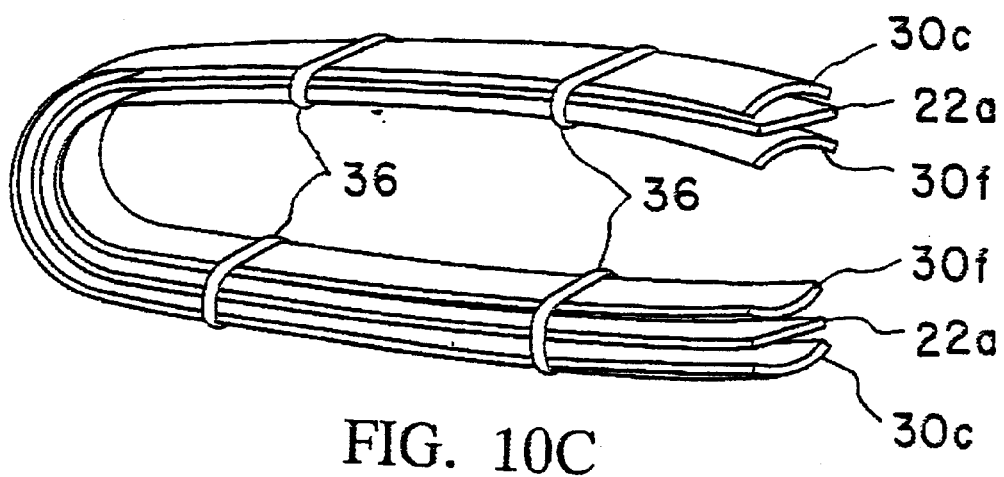

FIG. 10B, which is shown in correspondence to FIG. 5B, shows a lateral cross sectional view when a cable 22a which is wider than each of support members 30a–30c is supported and held by disposing a plurality of the support members 30 of the present invention side by side. In the example, the wide cable 22a is divisionally supported and held from the lower surface thereof by the support members 30a–30c. Further, support members 30d–30f are placed on the upper surface of the cable 22a in place of a protective member 38 to thereby hold the cable 22 by the respective pairs of the support members 30a–30d, 30b–30e and 30c–30f as well as curved portions are formed by bending the support members at midpoints in the longitudinal direction thereof so that the lateral convex portions of the respective support members face outward. Then, the cable 22a and the support members 30a–30c are slidably bundled by being wrapped by wrappers 36 at every specific intervals in the longitudinal direction of the support members 30a–30f as well as they are prevented from being dislocated laterally by the arrangement.

Figure 11B:
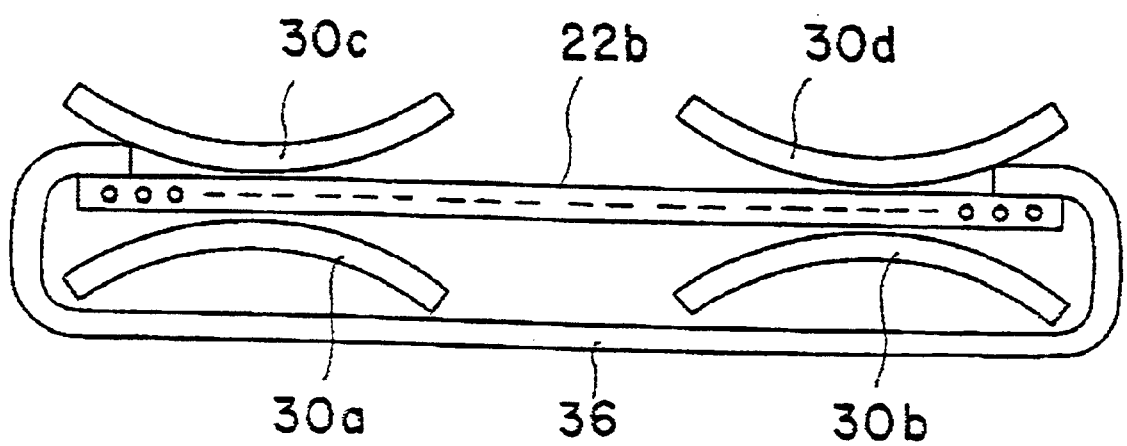
Figure 11C:
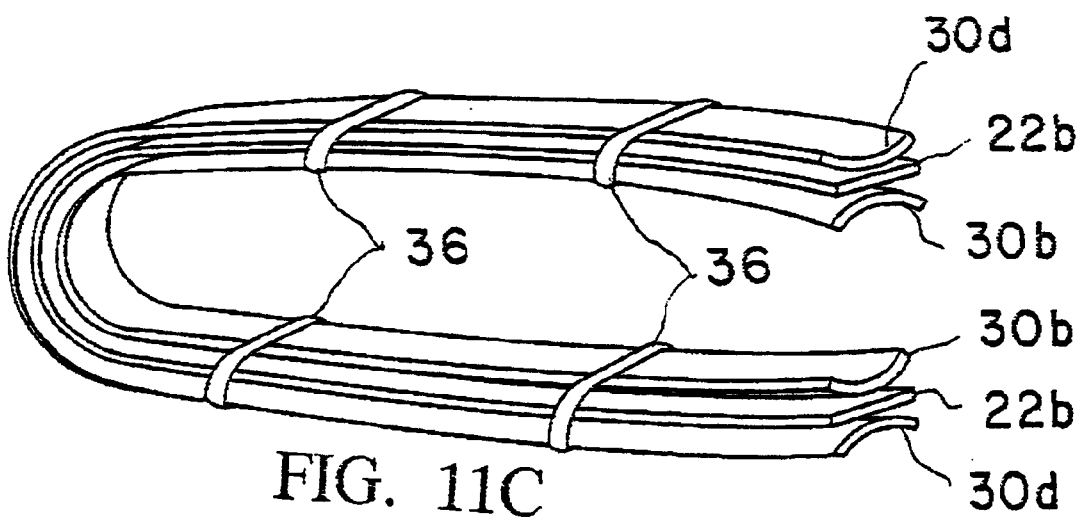

FIG. 11B, which is shown in correspondence to FIG. 6B and FIG. 10B, shows a lateral cross sectional view of a further embodiment of the present invention wherein support members 30c, 30d are used in place of the protective member 38 shown in FIG. 6B as well as support members 30a, 30b are placed on the lower surface of a cable 22a side by side so that the lateral convex portions thereof face inward (FIG. 11C). Then, the cable 22a is slidably bundled by being wrapped by wrappers 36 at every specific intervals in the longitudinal direction of the support members 30a–30d as well as it is prevented from being dislocated laterally by the arrangement.

Figure 12A:
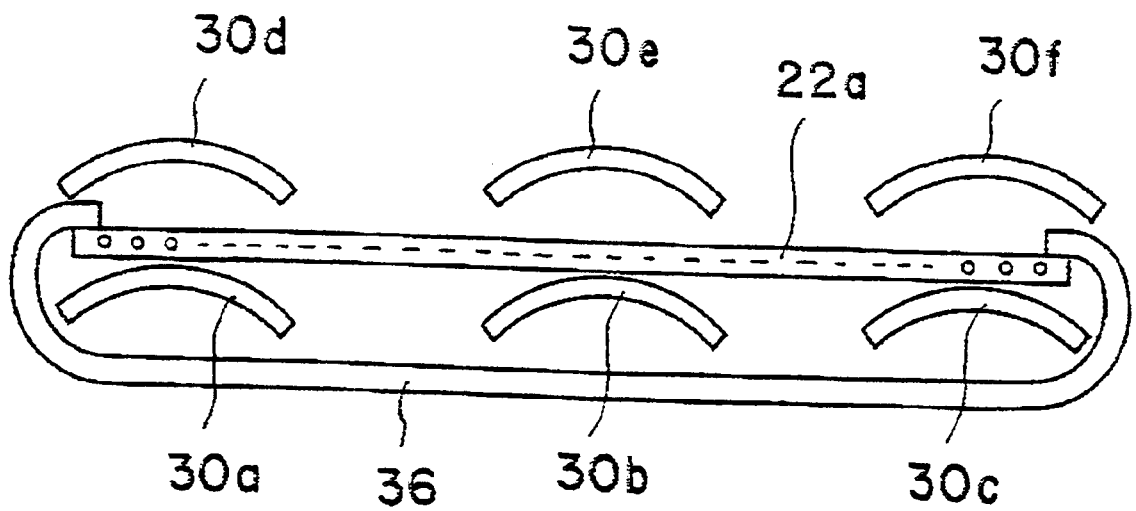
FIGS. 12A and 12B are views showing a modification of FIGS. 10A to 10C.
Figure 12B:
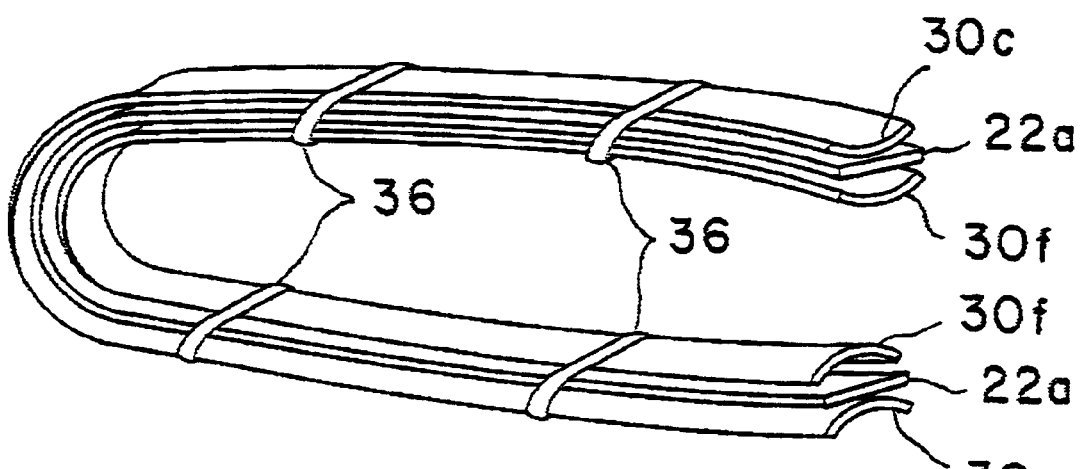

FIGS. 12A and 12B, which are shown in correspondence to FIGS. 11B and 11C, show a lateral cross sectional view and a perspective view of a still further embodiment of the present invention wherein the surfaces of support members 30d–30f used in place of the protective member 38 with which a cable 22a comes into contact are turned 180° from the direction of FIG. 11B. This arrangement permits the wide cable 22a to be supported and held by a plurality of the narrower support members as well as the disposition of wrappers 36 only in the spaces between the support members 30a–30c and between the support members 30b–30d at every specific intervals allows the cable 22a to be slidably bundled and prevents the lateral displacement thereof.

Figure 13A:
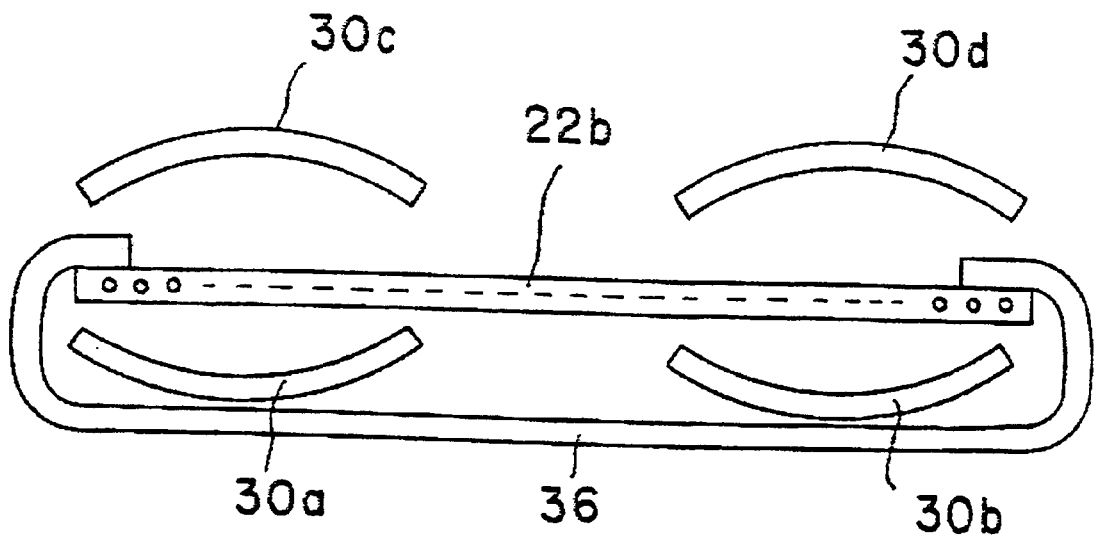
FIGS. 13A and 13B are views of a modification of FIGS. 10A to 10C.
Figure 13B:
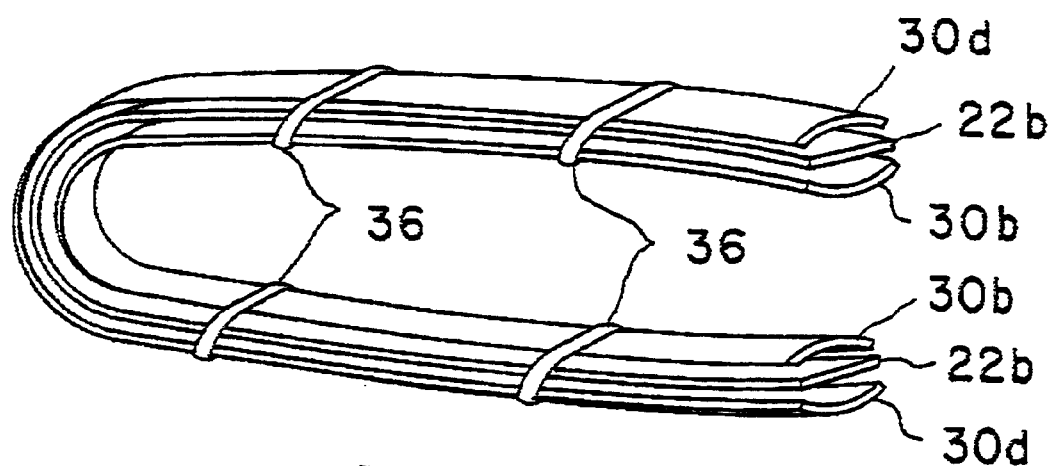

FIGS. 13A and 13B, which are shown in correspondence to FIGS. 12A and 12B, show a lateral cross sectional view and a perspective view of a yet still further embodiment of the present invention, wherein the surfaces of support members 30a, 30b with which a cable 22a comes into contact are turned 180° from the direction of FIG. 12A. This arrangement permits the wide cable 22a to be supported and held by a plurality of the narrower support members as well as wrappers 36 disposed only in the spaces between the support members 30a–30c and between the support members 30b–30d at every specific intervals can slidably bundle the cable 22a and prevent the lateral displacement thereof.

Next, operation of the embodiment of FIG. 1 arranged as described above will be described. First, when a rotation command is supplied from the controller 20 to the motor 44 through the cable 22b and the like, the printer head 40 reciprocates along the screw shaft 46 to thereby determine a printing position. Thus, the cables 22a, 22b and the hoses 26 disposed to a semi-loop shape between the printer head 40 as the movable section and the non-moving section of the base of the apparatus also travel together with the printer head 40. At the time, since the lateral cross section of the support member 30 which guides and holds the cable 22a or 22b is formed to the arc-shape, it has such a nature that wrinkles, strains and the like are difficult to be caused thereto, and when it is curved at a midpoint thereof, the lateral cross section is gradually changed and made near to a flat surface (or a linear line) as shown in FIGS. 2C and 2D and FIGS. 3C and 3D and further the radius of curvature of the curved portion is made approximately constant during a travelling movement. As a result, the flat cables 22a, 22b and the hoses 26 can make a reciprocating motion while being curved with a specific radius of curvature at all times as shown in FIG. 4.

Since the rigidity of the support member 30 is made higher than that of the flat cables 22a, 22b and the hoses 26 in the degree by which the driving force of the motor 44 is reduced, the cables 22a, 22b and the hoses 26 are deformed and moved following to the support member 30 at all times and thus the support member 30 is always curved with the specific radii of curvatures R2 and R3 even at the curved portions B. Moreover, since the lateral cross section of the curved portion B is made near to the flat surface at as shown in FIG. 2D and FIG. 3D, even if the cables and the hoses are clamped by the support member 30 in a sandwich state in any combination as shown in FIG. 10 to FIG. 13, the support member does not bite into the cables and the hoses and is in a state equivalent to that it clamps them by a partially flat surface. Thus, a very flexible bending state of the support member can be realized with no stress applied thereto.

When the print head promptly travels to a desired printing position, a pulse-like printing command is supplied to the ink nozzles 42m–42k through the cable 22a so that color print can be executed in a desired dot pattern. Since the ball screw 46 is fixed and the printer head 40 is moved by the motor 44 in the embodiment shown in FIG. 1, even if the printer head 40 is moved at an ultra-high speed of 2 m/sec., the vibrating width of the printer head 40 in the up/down and right/left directions can be easily suppressed within several microns.

Since the support member 30 is neither lifted up nor get entangled as described above, the cables and the hoses are less mechanically damaged so that the failure of the cables and the hoses such as the break, caught state and the like thereof is dramatically reduced as well as since the apparatus has a compact and simple structure, there can be realized an energy-supplying, signal-transmitting and/or material-supplying apparatus which is excellent also in design can be realized.

Figure 7A:
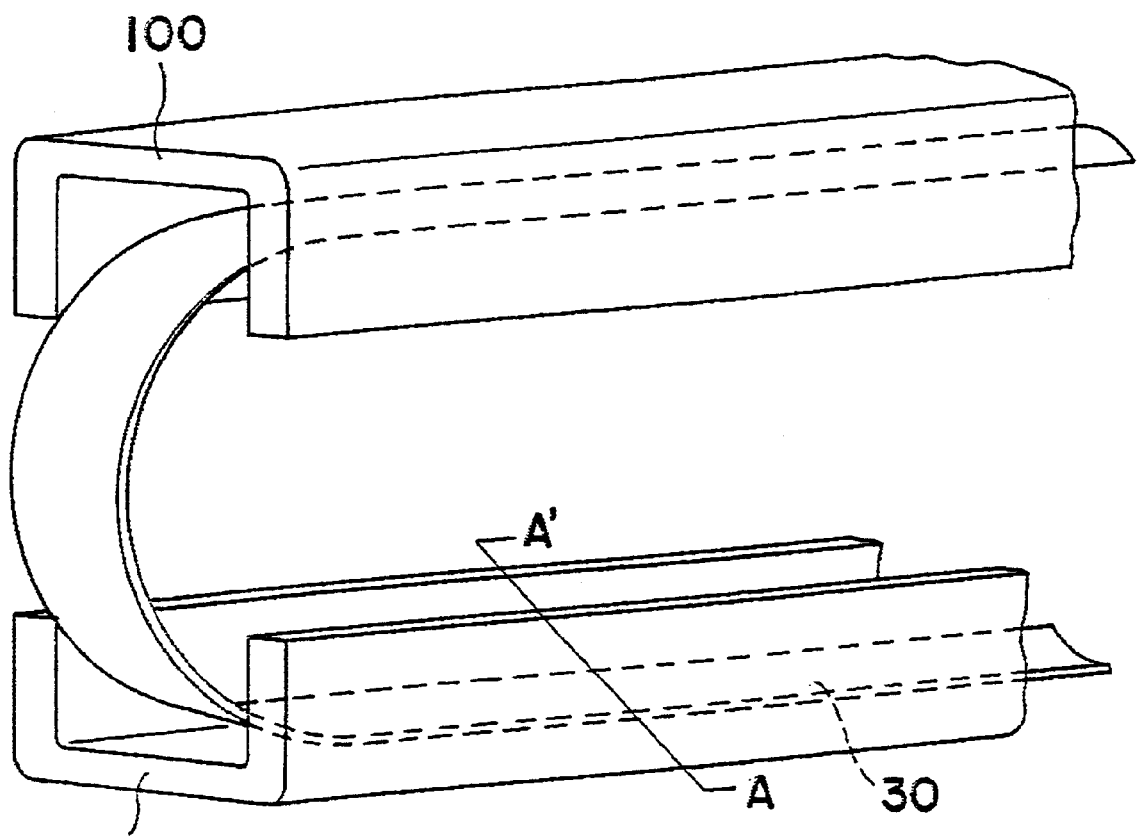
FIGS. 7A and 7B are perspective views showing the supplying apparatus of the present invention accommodated in a guide groove and a view showing the mounting direction thereof.
Figure 7B:
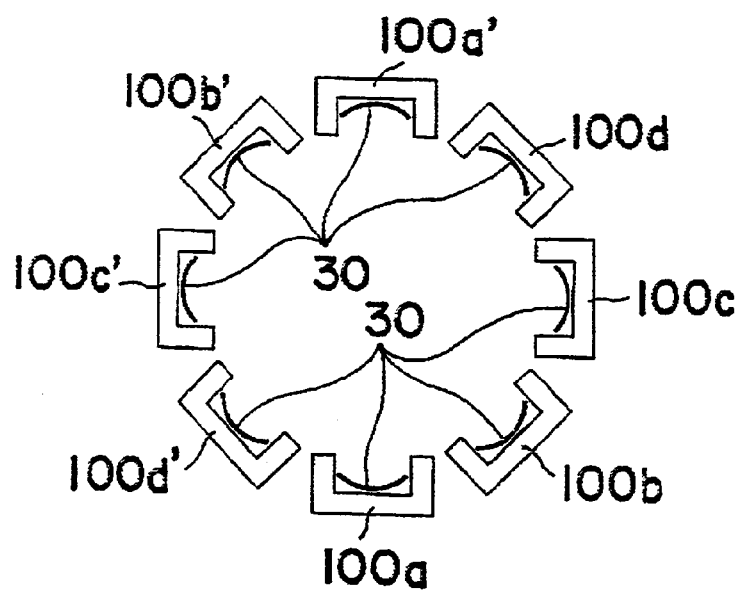

Next, a safety securing and/or slack preventing device in the energy-supplying, signal-transmitting and/or material-supplying apparatus will be described as an application example of the present invention with reference to FIG. 7. When the movable section 40 travels a long distance of 1–10 m, the support member 30 requires a length of the traveling distance+α. When a support member is disposed at a position other than the base of the apparatus by being fixed as a single member in a hollow space, it is fixed in the hollow space adjacent to the movable section in the state slacked by its dead load and the weight of the cable itself and the like. Further, even if the movable section 40 travels a short distance where the support member 30 is not slacked, when the worker performs a job with his hand and foot located in a hollow space near to the movable section for the adjusting job and the like of the movable section, the exposed disposition of the support members 30a–30f may cause a portion of the worker to be caught by the support member 30 in movement. To cope with this problem, when the support member 30, the support members 30a–30f and the like are accommodated in a guide groove 100 such as a flat plate, U-shaped groove, L-shaped groove, arc-shaped groove or the like, the worker can safely perform an adjusting work about the movable section and the like in the state that a portion of his body is supported by the guide groove 100, which can ensure safety to the worker. Further, although the support member 30 is ordinarily reciprocated by being horizontally fixed in the state of 100a–100a' in FIG. 7B, when the support member 30 is accommodated in the guide groove 100, the longitudinal direction of the support member 30 can be fixed by being inclined in the direction of 100b–100b', the horizontal direction of 100c–100c', the direction of 100d–100d' and the like with respect to the horizontal direction and then reciprocated. In addition, when the support member 30 is accommodated in the guide groove 100, the twist, slack and the like of the support member 30 can be prevented even if it is reciprocated in the state that its longitudinal direction is inclined with respect to the horizontal direction.

Figure 8:
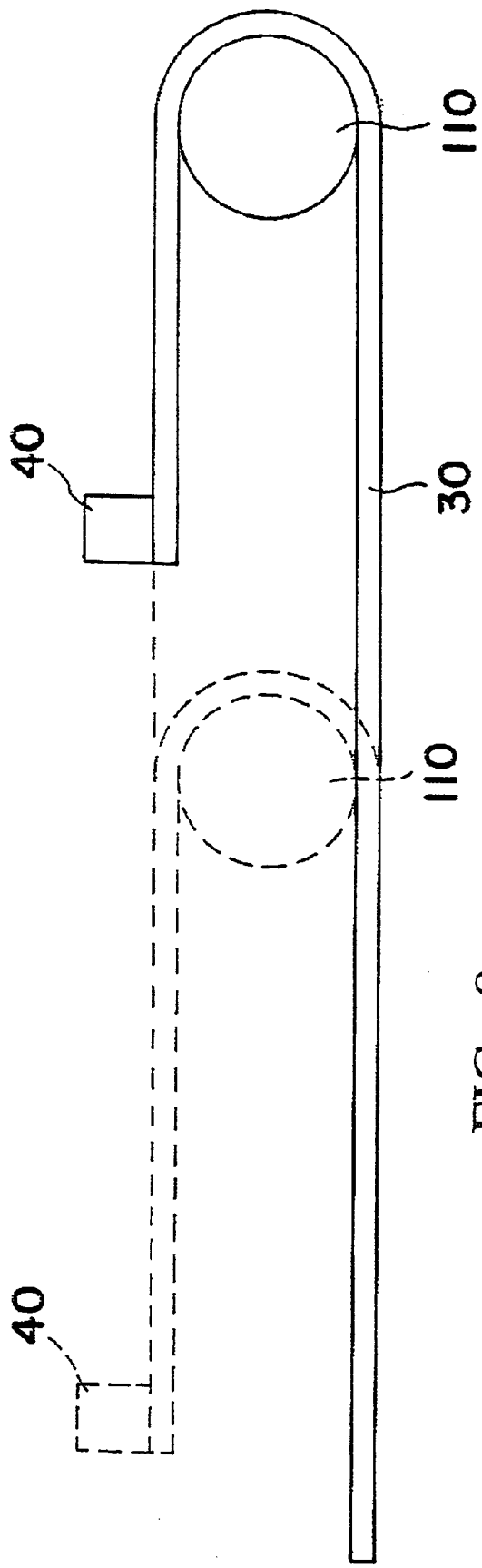
FIG. 8 is a view describing how the slack of the support member is prevented by an idle wheel.

Further, when the support member 30 travels a long distance, the slack of the support member 30 can be prevented by a roller guide or an idler 110 disposed to the inside of the curved portion B as shown in FIG. 8.

FIG. 9 shows another application example of the present invention, wherein position measuring proximity sensors 200–210a, 210b and the like are mounted on the support member 30 or the cable/hose so that the position of the movable section 40 can be measured only within the traveling space of the support member 30. That is, when translucent-type proximity sensors or reflex-type proximity sensors 200–210 are disposed at desired positions of the support member 30, respectively, they can measure the positions (positions 210a, 210b in the example of FIG. 9) and timings at which the movable section 40 passes through or crosses the sensors in response to the reciprocating motion of the movable section 40. An optical proximity sensor including an infrared proximity sensor which makes use of a laser beam and the like, a high-frequency proximity sensor for sensing metal and/or a magnetic type proximity sensor making use of a Hall IC and a strain sensor such as a pressure sensitive sensor, a strain gauge which operates when a curve portion is formed, and the like can be used as the above proximity sensor.

In the above position measuring method and apparatus, the position measuring sensors can be installed simultaneously with the disposition of the support member 30 and the like and no additional work for mounting the position measuring sensors by remodeling the non-moving section of the apparatus, building and the like is required. Further, since the mounting positions of the position measuring sensors can be changed to any arbitrary desired positions by moving the sensors along the support member 30, a position adjusting work can be very easily performed as well as since mounting spaces need not be additionally provided for the position measuring sensors, the spaces of the movable section can be very compactly assembled.

Although the ink liquids are supplied from the hoses 26 in the example described above, it is also possible in an automatic animal/plant raising plant to supply feed to animals and nutritional liquid and the like to plants and bacteria. Reaction gas and the like can be supplied through the hose 26 in a semiconductor manufacturing factory and the like. Further, although the above example shows the example of using electric energy as an example of transmitting and receiving energy and signals, it is apparent to persons skilled in the art that the present invention can be applied to transmit and receive optical energy and optical signals when optical fibers or the like are used.

As described above, according to the energy-supplying, signal-transmitting and/or material-supplying method and apparatus of the present invention, since the lateral cross section of the support member is formed to the arc-shape, no-wrinkle, no-stepped portion, no-folded portion and the like are caused to the support member, the lateral-arc-shaped surface of the support member is changed to the flat shape at a curved portion thereof at a midpoint as well as the radius of curvature of the curved portion is made constant and the cables/hoses which slide and travel along the support member are smoothly bent with a constant radius of curvature at all times, the support member is neither lifted up nor get entangled and the break and connection failure of the cables and the hoses are eliminated, whereby the reliability of the apparatus can be greatly improved.

When the screw shaft 46 is fixed and the motor is incorporated in the movable section 40, the vibration of the movable section can be greatly reduced when it reciprocates and no vibration is applied to the support member and the cables/hoses which are fixed to the movable section and accordingly this is very effective to the prevention of the break and the like of the cables. Since the present invention is simply arranged, it is effective to reduce the size of the apparatus, and when the position sensors are mounted on the support member, a job for mounting and adjusting limit-switches for setting a reciprocating range can be effectively performed.

Further, when the apparatus of the present invention is entirely accommodated in the guide groove, it can be expected to prevent the slack of the support member which causes a problem in a relatively long traveling distance as well as there is an advantage that the space and direction where the apparatus is mounted can be arbitrarily set. Since the guide groove acts as a safety cover, there can be expected an advantage that when the operator works in the vicinity of the traveling mechanism, an accident for causing the operator to be caught by the traveling mechanism can be prevented by the guide groove. In addition, the use of the support members 30b–30f in place of the protective member 38 can reduce a manufacturing cost as well as it can be expected that the addition of the electric conductivity to the support member 30 and the protective member 38 prevents the accumulation of static electric charges caused by friction and the like, whereby the reliability of the apparatus as a whole can be more improved.

What is claimed is:

1. An apparatus for a linearly-traveling mechanism comprising a movable section reciprocating along traveling guides and supplying-cables/hoses, which is guided and held by a flexible support member, for supplying one or more of energy, at least one signal, and at least one material to or from a non-moving section and the movable section, wherein the supplying-cables/hoses are extended along the support member, and slidably wrapped by a protective material while smoothly sliding along the support member without separating therefrom, and, the support member is composed of a band-shaped solid member formed to an arc-shape which is curved in a lateral direction with one end of the support member fixed to the movable section and the other end thereof fixed to the non-moving section and travels while forming parallel portions which are parallel with the fixed portion of the movable section and the fixed portion of the non-moving section and a curved portion having an approximately constant radius of curvature with the convex direction of the lateral-arc-shaped portion facing inward.

2. An apparatus for a linearly-traveling mechanism according to claim 1, wherein the supplying-cables/hoses supply one or more of electric energy, optical energy, electric signals, and optical signals.

3. The apparatus of claim 1, wherein said apparatus is one of an energy-supplying apparatus, signal transmitting apparatus and material-supplying apparatus.

4. A material-supplying apparatus for a linearly-traveling mechanism comprising a movable section reciprocating along traveling guides and supplying-hoses guided and held by a flexible support member, for transporting or discharging materials from a non-moving section corresponding to the movable section, wherein the support member is composed of a band-shaped solid member formed to an arc-shape which is curved in a lateral direction with one end of the support member fixed to the movable section and the other end thereof fixed to the non-moving section and travels while forming parallel portions which are parallel with the fixed portion of the movable section and the fixed portion of the non-moving section and a curved portion having an approximately constant radius of curvature with the convex direction of the lateral-arc-shaped portion facing inward or outward.

5. An apparatus for a linearly-traveling mechanism according to claims 1 or 4, wherein the support member contains an iron metal material or whisker, copper, amorphous iron alloy, a nonferrous metal material or whisker or alloy thereof, glass, ceramics fiber or whisker, paper, animal/plant, fiber, rubber, synthetic rubber, synthetic resin, engineering plastic, FRP, CFRP, or a combination thereof.

6. An apparatus for a linearly-traveling mechanism according to claims 1 or 4, wherein the supplying-cables/hoses supply materials containing solid particles, fine solid particles, liquids, gas, or a mixture thereof.

7. An apparatus for a linearly-traveling mechanism according to claims 1 or 4, wherein the movable section is the printer head unit of an inkjet printer and the supplying-cables/hoses supply printing ink liquids.

8. A method for a linearly-traveling mechanism comprising a movable section reciprocating along traveling guides and supplying-cables/hoses, which is guided and held by a flexible support member, for supplying one or more of energy, at least one signal, and at least one material to or from a non-moving section and the movable section, comprising the steps of:

composing the support member of a band-shaped solid member formed to an arc-shape curved in a lateral direction;

synthesizing slidable cables/hoses by laminating the support member to the supplying-cables/hoses;

fixing one end of the support member to the movable section as well as fixing the other end thereof to the non-moving section so as to form parallel portions which are parallel with the fixed portion of the movable section and the fixed portion of the non-moving section and a curved portion having an approximately constant radius of curvature with the convex direction of the lateral-arc-shaped portion facing inward; and reciprocating the movable section so that the radius of curvature of the support member has the approximately constant radius of curvature.

9. A method for a linearly-traveling mechanism according to claim 8, wherein the supplying-cables/hoses supply one or more of electric energy, optical energy, electric signals, and optical signals.

10. The method of claim 8, wherein the method is one of an energy-supplying method, signal transmitting method and material-supplying method.

11. A material-supplying method for a linearly-traveling mechanism comprising a movable section reciprocating along traveling guides and supplying-hoses, which is guided and held by a flexible support member, for supplying or discharging materials from a non-moving section corresponding to the movable section, comprising the steps of:

composing the support member of a band-shaped solid member formed to an arc-shape curved in a lateral direction;

synthesizing slidable hoses by laminating the support member to the supplying-hoses;

fixing one end of the support member to the movable section as well as fixing the other end thereof to the non-moving section so as to form parallel portions which are parallel with the fixed portion of the movable section and the fixed portion of the non-moving section and a curved portion having an approximately constant radius of curvature with the convex direction of the lateral-arc-shaped portion facing inward or outward, and reciprocating the movable section so that the radius of curvature of the support member has the approximately constant radius of curvature.

12. A method for a linearly-traveling mechanism according to claims 8 or 11, wherein the support member contains an iron metal material or whisker, copper, amorphous iron alloy, a nonferrous metal material or alloy thereof, glass, ceramics fiber or whisker, paper, animal/plant fiber, rubber, synthetic rubber, synthetic resin, engineering plastic, FRP, CFRP, or a combination thereof.

13. A method for a linearly-traveling mechanism according to claims 8 or 11, wherein the supplying-cables/hoses supply materials containing solid particles, fine solid particles, liquids, gas, or a mixture thereof.

14. A method for a linearly-traveling mechanism according to claims 8 or 11, wherein the movable section is the printer head unit of an inkjet printer and the supplying-cables/hoses supply printing ink liquids.

15. An apparatus for a linearly-traveling mechanism comprising a movable section reciprocating along traveling guides and supplying-cables/hoses, which is guided and held by flexible support members for supplying one or more of energy, at least one signal, and at least one material to or from a non-moving section and the movable section, wherein the support members are composed of band-shaped solid members formed to arc-shape which are curved in a lateral direction, the supplying-cables/hoses are clamped between the support members which are laminated with one ends of the support members fixed to the movable section and the other ends thereof fixed to the non-moving section and the support members are traveled while forming parallel portions which are parallel with the fixed portion of the movable section and the fixed portion of the non-moving section and curved portions having an approximately constant radius of curvature with the convex direction of each lateral-arc-shaped portion facing inward or outward.

16. The apparatus of claim 15, wherein said apparatus is one of an energy-supplying apparatus, signal transmitting apparatus and material-supplying apparatus.

17. An apparatus for a linearly-traveling mechanism comprising a movable section reciprocating along traveling guides and supplying-cables/hoses, which is guided and held by flexible support members for supplying one or more of energy, at least one signal, and at least one material to and from a non-moving section and the movable section, wherein the support members are composed of a band-shaped solid member formed to an arc-shape which is curved in a lateral direction and the supplying-cables/hoses are clamped between the support members which are laminated with one ends of the support members fixed to the movable section and the other ends thereof fixed to the non-moving section and the support members are traveled while forming parallel portions which are parallel with the fixed portion of the movable section and the fixed portion of the non-moving section and curved portions having an approximately constant radius of curvature with the convex direction of each lateral-arc-shaped portion facing inward or outward as well as a plurality of the laminated support members are disposed to thereby guide and hold the wide-cables/hoses.

18. The apparatus of claim 17, wherein said apparatus is one of an energy-supplying apparatus, signal transmitting apparatus and material-supplying apparatus.

19. An apparatus for a linearly-traveling mechanism according to claims 15 or 17, wherein the support member contains an iron metal material or metal whisker, copper, amorphous iron alloy, a nonferrous metal material or whisker or alloy thereof, glass, ceramics fiber or whisker, paper, animal/plant fiber, rubber, synthetic rubber, synthetic resin, engineering plastic, FRP, CFRP, or a combination thereof.

20. An apparatus for a linearly-traveling mechanism according to claim 19, wherein the supplying-cables/hoses supply one or more of electric energy, optical energy, electric signals, optical signals, and at least one material containing solid particles, fine solid particles, liquids, gas, or a mixture thereof.

21. An apparatus for a linearly-traveling mechanism according to claims 15 or 17, wherein the supplying-cables/hoses supply one or more of electric energy, optical energy, electric signals, optical signals, and at least one material containing solid particles, fine solid particles, liquids, gas, or a mixture thereof.

22. A method for a linearly-traveling mechanism comprising a movable section reciprocating along traveling guides and supplying-cables/hoses, which is guided and held by flexible support members for supplying one or more of energy, at least one signal, and at least one material to and from a non-moving section and the movable section, comprising the steps of:

composing the support member of a band-shaped solid member formed to an arc-shape curved in a lateral direction;

synthesizing the supplying-cables/hoses to slidable cables/hoses by clamping them between the support members which are laminated;

fixing one ends of the laminated support members to the movable section as well as fixing the other ends thereof to the non-moving section so as to form parallel portions which are parallel with the fixed portion of the movable section and the fixed portion of the non-moving section and curved portions having an approximately constant radius of curvature with the convex direction of each lateral-arc-shaped portion facing inward or outward; and reciprocating the movable section so that the radius of curvature of the support members has the approximately constant radius of curvature.

23. The method of claim 22, wherein said method is one of an energy-supplying method, signal transmitting method and material-supplying method.

24. A method for a linearly-traveling mechanism according to claim 22, wherein the support member contains an iron metal material or metal whisker, copper, amorphous iron alloy, a nonferrous metal material or whisker or alloy thereof, glass, ceramics fiber or whisker, paper, animal/plant fiber, rubber, synthetic rubber, synthetic resin, engineering plastic, FRP, CFRP, or a combination thereof.

25. The method according to claim 22, wherein the supplying-cables/hoses supply one or more of electric energy, optical energy, electric signals, optical signals, and at least one material containing solid particles, fine solid particles, liquids, gas, or a mixture thereof.

* * * * *